L. ROUANET.
DETACHABLE WHEEL.
APPLICATION FILED FEB. 16, 1920.

1,388,605.

Patented Aug. 23, 1921.
2 SHEETS—SHEET 1.

INVENTOR:
Louis Rouanet
By Wm Wallace White
ATTY.

L. ROUANET.
DETACHABLE WHEEL.
APPLICATION FILED FEB. 16, 1920.
1,388,605.
Patented Aug. 23, 1921.
2 SHEETS—SHEET 2.
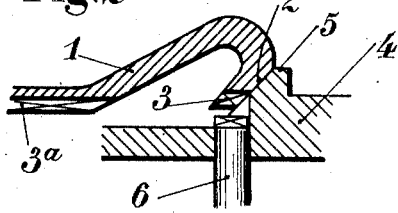
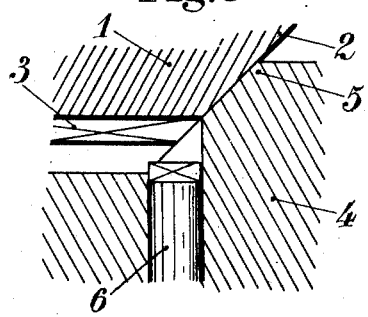
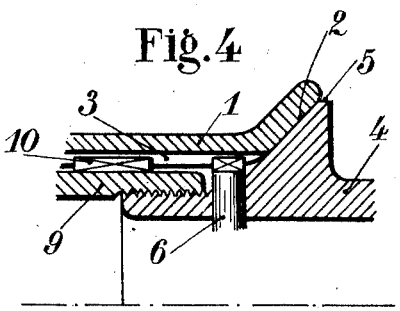
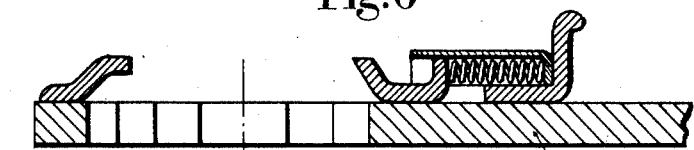
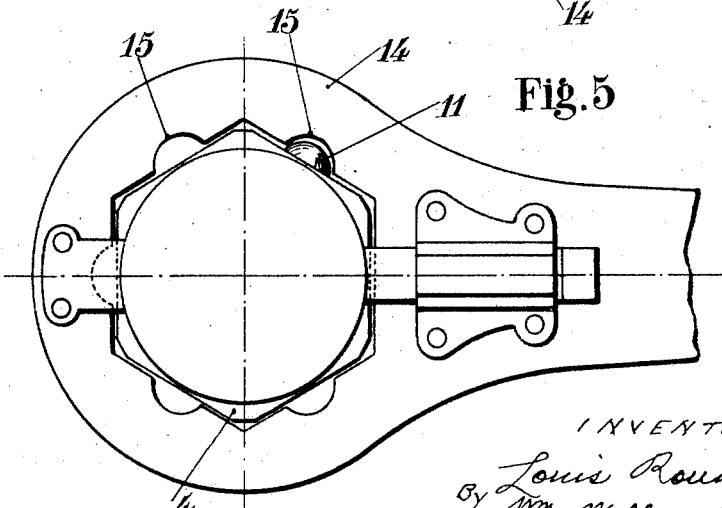
INVENTOR:
Louis Rouanet
By Wm Wallace White
ATT'Y.

UNITED STATES PATENT OFFICE.

LOUIS ROUANET, OF IVRY PORT, FRANCE, ASSIGNOR TO COMPAGNIE D'APPLICATIONS MECANIQUES, OF PARIS, FRANCE.

DETACHABLE WHEEL.

1,388,605.  Specification of Letters Patent.  Patented Aug. 23, 1921.

Application filed February 16, 1920. Serial No. 358,877.

*To all whom it may concern:*

Be it known that I, LOUIS ROUANET, citizen of the Republic of France, residing at 42 Rue Franklin, Ivry Port, Seine, in the Republic of France, have invented new and useful Improvements in Detachable Wheels, of which the following is a specification.

This invention relates to locking devices for detachable wheels, of the type in which the hub of the wheel carries on one hand locking teeth into which a bolt carried by the locking nut for the hub is adapted to engage and on the other hand driving teeth which coöperate with similar teeth provided on the false hub.

According to the invention, the said driving teeth are in alinement with the locking teeth whereby both kinds of teeth may be cut at the same time, so that the manufacture is considerably simplified.

In addition thereto, the locking teeth are provided adjacent the conical bore by which the hub bears upon the locking nut whereby the safety is increased.

The invention consists also in providing in some of the walls of the wrench used for mounting and dismounting the hub, inner recesses into any one of which the projecting end of the bolt carried by the locking nut may extend, which arrangement is highly advantageous as will hereinafter appear.

In the annexed drawings, given by way of example:

Figs. 2, 3 and 4 are sectional views of the sets of the teeth, on a larger scale, Fig. 2 corresponding to the construction shown on Fig. 1 while Figs. 3 and 4 show modifications.

Fig. 5 is an elevation view of the wrench in position on the hub.

Fig. 6 is a corresponding section along A—A Fig. 5.

Figure 1:
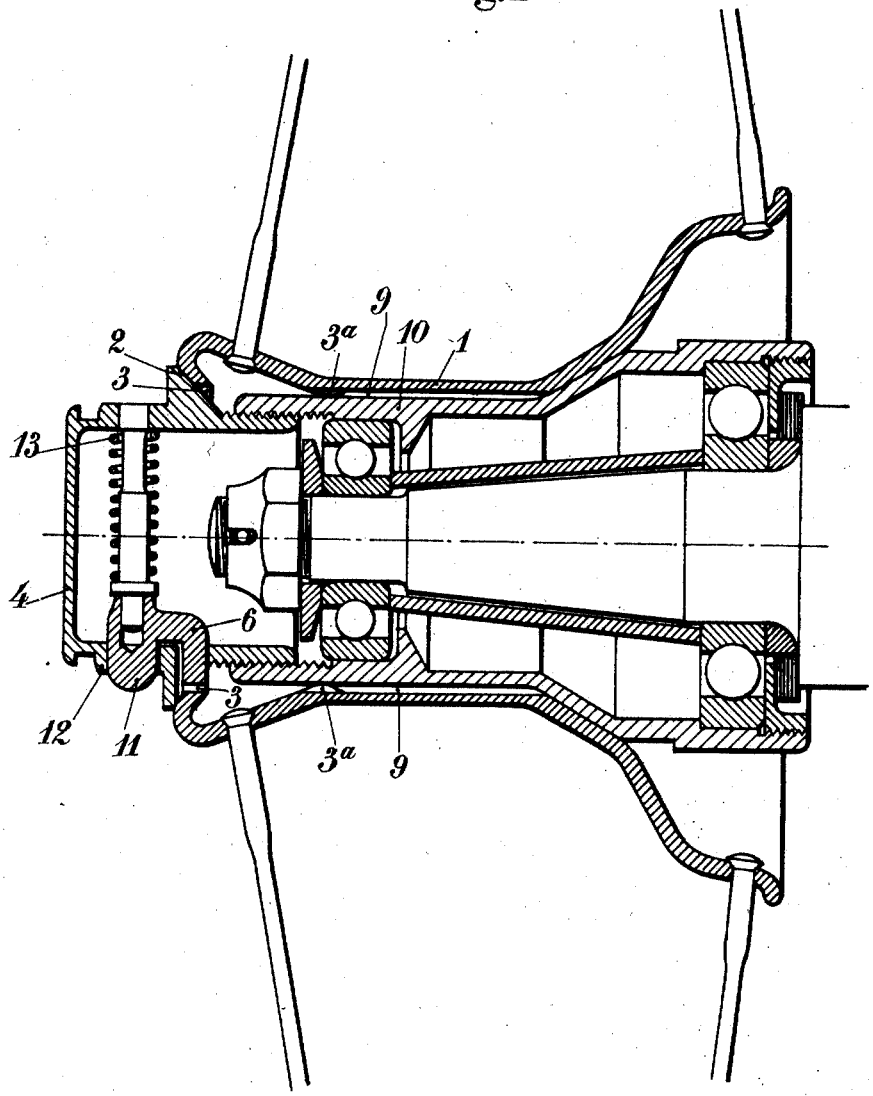
Figure 1 is a sectional view of a detachable wheel hub constructed in accordance with the invention.

The removable hub 1 is provided at one of its ends with a conical bore 2 and an annular set of locking teeth 3. The nut 4 used for locking the hub in position has a conical part 5 adapted to bear within the conical bore 2 and carries a bolt or locking finger 6. The bolt 6 rotates with the locking nut and is forced into engagement with the teeth 3 by a spring 13 whereby the nut is locked in position.

The hub is also provided with driving teeth $3^a$ which engage similar teeth 10 provided on the false hub 9.

It will be seen that the driving teeth $3^a$ are in alinement with the locking teeth 3 and form so to speak an extension of the latter. By this arrangement, the manufacture of the hub is considerably simplified, both kinds of teeth being cut at the same time. Moreover, the conical bore 2 by which the hub rests upon the nut 4 being in the immediate vicinity of the locking teeth 3 an extremely safe locking is obtained.

Fig. 2 is a detail on a larger scale of the construction shown in Fig. 1.

In the constructions shown in Figs. 3 and 4, the locking teeth 3 themselves are used for the drive.

The bolt 6 is made integral with a rounded knob 11 which projects through one face 12 of the nut when the latter is locked. When however the knob 11 is flush with the face 12 of the nut, the bolt is disengaged from the toothing and the nut is free.

For removing the hub, it will be sufficient to place the wrench 14 (Fig. 5) on the nut whereby the knob 11 is forced inwardly; the bolt 6 is thus disengaged from the teeth 3 and the nut may be rapidly unscrewed by means of the wrench.

Some of the inner walls of the wrench opening are provided with recesses 15 (Fig. 5). When the wrench is placed on the nut so that one of said recesses 15 coincides with the knob 11, the bolt is not disengaged. By means of this arrangement, when the nut has been normally tightened up, the locking may be completed by tightening the nut a little farther so that the bolt may fall exactly between two teeth 3. Inasmuch as the recesses 15 in the wrench permit to see the knob 11, which should project entirely into one of said recesses when the locking is completed, the operation may be easily inspected from the outside.

Having now described my invention, what I claim as new and desire to secure by Letters Patent, is:

1. A detachable wheel construction comprising in combination a false hub, driving teeth on said false hub, a wheel hub surrounding said false hub, driving teeth on said wheel hub, adapted to engage the driving teeth on the false hub, locking teeth on said wheel hub, a locking nut adapted to be secured to the false hub and to engage with the wheel hub, and a bolt carried by said locking nut, and adapted to engage the said locking teeth, the driving teeth and the locking teeth on the wheel hub being in alinement and thereby adapted to be cut in one operation.

2. A detachable wheel construction comprising in combination, a false hub, driving teeth on said false hub, a wheel hub surrounding said false hub, driving teeth on said wheel hub adapted to engage the driving teeth on the false hub, locking teeth on said wheel hub, a locking nut adapted to be secured to the false hub, the wheel hub having adjacent the locking teeth a conical bore into which a corresponding part on the locking nut is adapted to engage and a bolt carried by said locking nut, and adapted to engage the said locking teeth, the driving teeth and the locking teeth on the wheel hub being in alinement and thereby adapted to be cut in one operation.

In testimony whereof I have signed my name to this specification.

LOUIS ROUANET.